United States Patent Office 3,334,089
Patented Aug. 1, 1967

3,334,089
PROCESS FOR THE CONTINUOUS PRODUCTION OF LAURIN LACTAM
Johann Harms and Walter Thomas, Marl, Germany, and Clau Berther and Hans Joachim Schultze, Chur, Switzerland, assignors to Inventa A.G., für Forschung und Patentverwertung, Zurich, Switzerland
No Drawing. Filed Feb. 1, 1965, Ser. No. 429,633
Claims priority, application Switzerland, Jan. 30, 1964, 1,070/64
5 Claims. (Cl. 260—239.3)

The invention relates to a process for the continuous production of laurin lactam.

It is known that laurin lactam, which is employed for the production of synthetic fibres, foils and molded bodies, is produced by oximation of cyclododecanone and subsequent Beckmann rearrangement. Many methods have become known for performing the individual steps, but these are little suited to the continuous industrial manufacture of laurin lactam.

Depending on the mode of procedure, one obtains both the cyclododecanone oxime and the ω-dodecanone lactam or, if the oximation and rearrangement are carried out in one reaction, only the dodecanone lactam, during the working up as solid substances and these render necessary, for their purification and separation, either special filtration and washing apparatus or the use of organic solvents for extracting the oxime or for recrystallising the lactam.

The use of elevated temperatures alone in the production of laurin lactam, which keeps the reaction products in a liquid state, results in discoloration occurring from 100° C.; however, because the cyclododecanone oxime is already noticeably unstable at its melting point (134° C.), this discoloration can be removed from the lactam (melting point 150° C.) only with difficulty.

Moreover, such an operation would have to be carried out at elevated pressure in order to keep the aqueous solution below its boiling point. Likewise, under these conditions, the lactam would become increasingly saponified.

It is an object of the invention to provide a process for the continuous production of laurin lactam which is free of the above shortcomings.

It has now been found that laurin lactam can be produced in a continuous method of working at temperatures above 70° C., preferably above 90° C., by reacting cyclododecanone with hydroxyl amine salt solutions and subsequent Beckmann rearrangement with sulphuric acid if the oximation and the Beckmann rearrangement are carried out in liquid phase in the presence of a water-immiscible cycloaliphatic solvent which is, for all practical purposes, resistant to sulphuric acid, or oleum, at the reaction temperature and the boiling point of which is so high that it can also be separated easily from the lactam by distillation.

Solvents which can be used are, for example, cycloaliphatic hydrocarbons such as decalin, butyl cyclohexane, pentyl cyclohexane, hydrocumol, cyclododecane. Particularly suitable are cyclododecane and alkylated cyclohexanes having 3 to 6 C atoms in the alkyl radical. Paraffins are less suitable, since they generally display too low a solubility for the reaction products or have an unsuitable boiling point. Cyclododecanone itself can be used with particular advantage as solvent.

Advantageously, those solvents which boil in the range from 100 to 200° C. are used.

The process can be performed in a single-stage or multi-stage manner. When, for example, cyclododecane is used as solvent, the multi-stage process will be preferred. Generally, the following method of operation will be adopted:

In the first stage, a mixture consisting of cyclododecanone, the solvent, for example cyclododecane or one of the other above-mentioned hydrocarbons, and an aqueous hydroxylamine salt solution, preferably a hydroxylamine sulphate solution, is reacted in a stirring vessel at a temperature of 70 to 100° C., preferably 90 to 100° C., with the addition of an alkaline agent, such as, for example, sodium hydroxide, preferably ammonia, at a pH value between 1 and 7, preferably, however, between 4 and 5. The quantity of hydroxylamine used, calculated on the cyclododecanone used, should be less. In general, 70 to 90% of the stoichiometric amount will preferably be used in this stage. The aqueous hydroxyl amine salt solution, for example hydroxylamine sulphate, generally has a concentration of 5 to 25 percent by weight, preferably from 15 to 25% by weight.

The solvent and the cyclododecanone are employed in a ratio by weight at which the mixture is liquid at the reaction temperature. A 70:30 cyclododecane/cyclododecanone oxime mixture, for example, is liquid above 90° C. in the presence of the aqueous oximation solution. The liquid reaction mixture consisting of cyclododecanone, cyclododecanone oxime and cyclododecane which is obtained in the first stage can be separated readily from the subjacent aqueous solution and can be washed with hot water. The organic phase is then treated with a hydroxylamine salt solution in a second stirring vessel under the same reaction conditions until the cyclododecanone has been completely converted, a more concentrated solution, preferably a 15 to 25% solution, being advantageously used so as not to introduce too large amounts of water into the reaction mixture. The reaction mixture is separated in a connected heated settling vessel, the excess aqueous hydroxylamine salt solution being carried back to the first stirring vessel.

The liquid mixture consisting of cyclododecanone oxime and cyclododecane is then gradually introduced into sulphuric acid which has been preheated to a temperature of at least 90° C. The rearrangement is then carried out in a reaction vessel at temperatures between 90 and 140° C., preferably between 90 and 100° C. 100% sulphuric acid is preferably used, but, in order to compensate for the water entrained, it is also possible to employ oleum, the $SO_3$ content of which corresponds to the entrained water. The mixture is then diluted at the same temperature with a quantity of water such that a sulphuric acid of about 20% strength is preferably obtained. If required, it is also possible to effect neutralisation of the acid. The separated organic layer is then washed with slightly diluted lye, for example sodium hydroxide or aqueous ammonia, until it is free from acid. The resultant lactam-solvent mixture is worked up in a column, preferably under reduced pressure.

Of course, the oximation may be carried out entirely in one stage.

The reaction with excess cyclododecanone as solvent is particularly advantageous. In this method, with separate oximation of the cyclododecanone and rearrangement of the oxime, the reaction takes place, e.g. in such manner that the oximation is carried out with an excess of cyclododecanone, i.e. with a cyclododecanone conversion rate of about 40 to 65%. Under these conditions, at 90 to 95° C., the operation is carried out constantly in liquid phase, since the pure cyclododecanone already melts at 60° C. and a mixture of about 35% of cyclododecanone and 65% of cyclododecanone oxime is liquid from 95° C. up in the presence of the aqueous oximation solution.

The oximation preferably takes place at 95° C. and a pH of 1 to 7, preferably however at a pH of about 4, when hydroxylamine sulphate or other hydroxylamine salts are employed. With intensive stirring, the oximation takes place within a short time. The acid liberated during the oximation is neutralised in the customary manner by adequate addition of basic substance, preferably aqueous ammonia solution. The oximation products of the said composition, which are liquid in the hot state, can readily be separated from the subjacent aqueous solution, washed with hot water and dissolved in concentrated sulphuric acid preheated to 50 to 60° C., preferably 100% sulphuric acid, or else with rearrangement mixture. This sulphuric acid-cyclododecanone-cyclododecanone oxime mixture is thereafter subjected to Beckmann rearrangement at 90 to 140° C., preferably, however, at 110 to 120° C., in a reaction tube which is heated externally and in which the solution runs down the wall in the form of a thin film. The advantage of this method consists in that the rearrangement mixture is exposed to the reaction temperature for only 15 to 60 seconds, whereby in particular secondary reactions of the excess cyclododecanone are avoided.

When the oximation and rearrangement are carried out in a single-stage reaction, which is particularly advantageous, the same procedure is adopted in principle. At temperatures below 40° C., cyclododecanone and hydroxylamine, for example in the form of the sulphate or another suitable salt, are dissolved in 80 to 100% sulphuric acid. In this instance, the sequence in which the addition of the reactants takes place is immaterial. In accordance with the process according to the invention, the molar ratio of cyclododecanone to hydroxylamine salt is 1:0.3 to 0.7, preferably 1:0.4:0.65. The sulphuric acid solution of the reaction mixture is introduced into the reaction tube and flows down inside this tube in the form of a film, both the oximation and the Beckmann rearrangement of the cyclododecanone oxime produced to form ω-dodecalactam taking place.

In this case, the temperature in the reaction tube is 100 to 145° C., preferably, however, 125 to 135° C., and the residence time is preferably 45 to 75 seconds.

Irrespective of whether the single-stage or the two-stage reaction is carried out, the rearrangement product is diluted with a large excess of hot water, and, owing to the limit of solubility not being reached, the ω-dodecalactam (laurin lactam) formed and the excess cyclododecanone are separated in liquid form.

An essential special feature of the process according to the invention consists in that the mixture obtained and consisting of about 40–65% (30%) of ω-dodecalactam and 60–35% of cyclododecanone (70% of cyclododecane) is liquid at temperatures above 90° C. and therefore, by washing with hot water and/or ammonia solution, preferably greatly diluted, can readily be freed completely from the sulphuric acid and immediately supplied in liquid form to a distillation apparatus. The separation of the mixture by distillation does not cause any difficulties as a result of the great difference in the boiling points of the substances (cyclo-dodecanone: 85° C., cyclododecane: 60° C. and ω-dodecanone lactam: 169° C. at 1 mm. Hg).

The process has the advantage that the formation of solid substances is prevented and the reaction can therefore be carried out in liquid phase at temperatures at which as little discoloration and decomposition of the reaction products as possible occur.

The invention will now be more particularly described in a number of examples but these are given by way of illustration and not by way of limitation.

Percentages given in the following are by weight.

*Example 1*

117 g. of pure cyclododecanone are heated to 90 to 92° C. with 200 ml. of water acidified with sulphuric acid to a pH of 4. While stirring intensively, 20 g. of hydroxylamine sulphate are added to this mixture and the latter is maintained at a pH of 3.5 to 4.5 by continuous addition of 10% ammonia. After a reaction time of 2 hours, the temperature being increased to 95 to 96° C. towards the end of this time, 37.7% of the cyclododecanone have been converted into cyclododecanone oxime. The melting point of the mixture is 85 to 96° C. The yield of cyclododecanone oxime/cyclododecanone mixture is 120.2 g.

*Example 2*

A liquid mixure consisting of 48 g. of cyclododecanone oxime and 72.4 g. of cyclododecanone, prepared in the manner described in Example 1, corresponding to a ratio by weight of 39.9:60.1, is added dropwise to, and dissolved in 150 ml. of 100% sulphuric acid at 30° C. and is allowed to flow in the course of 75 minutes through a vertical steel tube 1 meter long and heated to 125° C. In order to work up the product issuing from the tube, the said product is introduced into 3 liters of water heated to 95° C., washed after separation of the dilute sulphuric acid with hot water of the same temperature, and finally with 0.5% ammonia, and thereby freed from the last traces of sulphuric acid. A mixture composed of 38.5% of ω-dodecanone lactam and 60.2% of cyclododecanone is obtained. By distillation in vacuo through a 30 cc. Vigreux column, 69.5 g. of cyclododecanone (B.P.$_{1 mm.}$=84 to 86° C.) and 46.7% of ω-dodecanone lactam (B.P.$_{1 mm.}$=168 to 170° C.) can be converted.

The yield of ω-dodecanone lactam, referred to cyclododecanone oxime used, is 97.3% of the theoretical.

*Example 3*

100.2 g. of pure cyclododecanone are dissolved at about 30° C. while stirring in 200 ml. of 100% sulphuric acid and 28.85 g. of hydroxylamine sulphate are added to this solution. This amount of hydroxylamine sulphate corresponds to a 65% conversion rate of the cyclododecanone into cyclododecanone oxime. After stirring for 2 hours at 30 to 40° C., the mixture is allowed to flow over the inside of the wall of a glass reaction tube 2 meters long— the said wall having been heated to 125° C. After precipitation of the reaction product with hot water and working up as described in Example 2, 98.7 g. of a liquid mixture consisting of 64.6% of dodecanone lactam and 32.1% of cyclododecanone is recovered. The theoretical composition is 66.6 to 33.4%. By distillation under reduced pressure, the mixture of the two constituents can be divided into the pure substances, as described in Example 2.

*Example 4*

A mixture consisting of 200 g. of cyclododecanone, 470 g. of cyclododecane and 72 g. of hydroxylamine sulphate in the form of an approximately 15% aqueous solution is reacted at 90° C. within 1 hour at a pH of 4 to 5 in a stirring vessel equipped with a high-speed stirrer, with the gradual addition of 35 g. of caustic soda in the form of a 10 to 50% aqueous solution, or of an equivalent quantity of ammonia, until the hydroxylamine sulphate has been practically completely converted. The mixture is then allowed to settle in a heated vessel at a temperature of 90° C. and the aqueous phase is drawn off at the bottom. 682 g. of a mixture of cyclododecane, cyclododecanone and cyclododecanone oxime are obtained as organic phase. This mixture is treated, in the same way as in the first reaction vessel, with 90 g. of hydroxylamine sulphate in the form of a 20% aqueous solution with the gradual addition of 9 g. of caustic soda in the form of a 10 to 50% aqueous solution to keep the pH value constant, until the cyclododecanone has been completely converted. The aqueous solution obtained after this reaction stage is returned to the first reaction vessel. 684 g. of a mixture consisting of cyclododecane and cyclododecanone oxime are obtained. The mixture has a solidification point of 84° C.

This mixture is introduced dropwise in liquid form into 290 g. of 100% sulphuric acid which has been preheated to 95° C., within 20 minutes and while stirring and cooling well. The temperature is maintained at 95 to 100° C.

Further stirring is thereafter carried out for 45 minutes at 95° C.

The reaction mixture then obtained has sufficient water added to it, at 95° C., to produce a sulphuric acid of approximately 20% strength.

The aqueous acid is separated at 95° C. in a settling vessel and the organic layer is washed with slightly diluted sodium hydroxide at 90° C. until free from acid. 682 g. of a lactam/cyclododecane mixture having a solidification point of 89° C. are obtained.

The mixture is separated into the pure constituents by distillation through a short column. The following fractions are obtained:

B.P.$_5$, 90 to 92° C., 468 g. cyclododecane
B.P.$_5$, 92 to 185° C., 1 g. intermediate fraction
B.P.$_5$, 185 to 190° C., 208 g. laurin lactam; 3 g. residue.

Hence, the yield of pure laurin lactam is 96% of the theoretical.

What we claim is:

1. In a process for the continuous production of laurinlactam at temperatures above 70° C. by reacting cyclododecanone with hydroxylamine salt solution and subsequent Beckmann rearrangement with sulfuric acid or oleum, the improvement, which consists in carrying out the oximation and the Beckmann rearrangement in liquid phase and in the presence of a water-immiscible cycloaliphatic solvent which has a boiling point so high that it can easily be separated from the lactam by distillation and which is substantially resistant to sulfuric acid and oleum at the reaction temperature.

2. The process according to claim 1, wherein cyclododecane is used as solvent.

3. The process according to claim 1, wherein excess cyclododecanone is used as solvent.

4. The process according to claim 1, wherein the conversion is carried out in a reaction tube in a single step.

5. The process according to claim 1, wherein the conversion is carried out in a multi-stage operation.

References Cited
UNITED STATES PATENTS

| | | | |
|---|---|---|---|
| 2,237,365 | 4/1941 | Schlack | 260—566 |
| 2,249,177 | 7/1941 | Schlack | 260—239.3 |
| 2,313,026 | 2/1943 | Schlack | 260—239.3 |
| 2,579,851 | 12/1951 | Novotny | 260—566 |

WALTER A. MODANCE, *Primary Examiner.*

JOHN D. RANDOLPH, *Examiner.*

R. T. BOND, *Assistant Examiner.*